2,914,500
Patented Nov. 24, 1959

2,914,500

COMPOSITION COMPRISING FLUORINE CONTAINING POLYOLEFIN PLASTICIZED WITH FLUORINE CONTAINING KETONE

William S. Barnhart, Cranford, and Joseph L. Zollinger, Bloomfield, N.J., assignors, by mesne assignments, to Minnesota Mining and Manufacturing Company, St. Paul, Minn., a corporation of Delaware No Drawing. Application July 30, 1956
Serial No. 600,669

14 Claims. (Cl. 260—32.8)

This invention relates to a novel polymeric composition and to a process for the preparation thereof. In one aspect this invention relates to a normally solid fluorine-containing polymeric composition of improved properties. In another aspect this invention relates to a process for modifying the properties of a normally solid fluorine-containing polymer. In a more particular aspect this invention relates to a novel polymeric composition comprising a high molecular weight polymer of trifluorochloroethylene which composition has improved properties, and to a method for the preparation thereof.

High molecular weight polymers including both resinous thermoplastics and elastomers are widely used in numerous industrial applications where their unusual chemical and physical properties are used to best advantage. Among the most outstanding of the properties of high molecular weight polymers, and particularly the fluorine-containing polymers such as those of trifluorochloroethylene, is chemical inertness. Thus such polymers may be exposed to a wide variety of oxidizing, reducing and solvent type reagents such as fuming nitric acid with no apparent effect on the polymers. In addition to their high degree of chemical stability, these polymers possess high thermal stability, excellent electrical properties and can be molded into various useful items.

In many applications in which industrial users employ high molecular weight polymers such as these of trifluorochloroethylene it is often desirable that the properties of the polymer be somewhat modified. For example, the techniques presently employed for molding polytrifluorochloroethylene thermoplastic often required the use of temperatures as high as 625° F. which high temperatures are often necessary in order to cause the polymer to flow readily. Such temperatures, however, may also cause undesirable degradation of the polymer. In the case of elastomeric polymers such as copolymers of trifluorochloroethylene and vinylidene fluoride containing between about 20 and about 69 mol percent of combined trifluorochloroethylene, it is often desirable to modify the properties of such polymers in order to obtain improvement in their low temperature flexibility.

One method commonly used to modify the properties of such high polymers is to admix the high polymer with a plasticizer. Many of the plasticizers presently employed, however, are relatively volatile and have a tendency to bleed during fabrication of the polymer, are deleteriously effected at the temperatures employed to mold the polymer and may tend to lower the degree of chemical inertness and heat stability of the polymer.

This application is a continuation-in-part of our prior and copending application Serial Number 517,927, filed June 24, 1955, now U.S. Patent No. 2,824,139.

It is an object of the present invention to provide a novel solid polymeric composition of improved properties.

Another object is to provide a high polymer having improved properties which properties will be retained under relatively extreme temperature conditions.

Another object is to provide novel fluorine-containing plastic and elastomeric polymer compositions, the properties of which are modified by a compound which does not volatilize or bleed during fabrication of the polymer.

Another object is to provide a high molecular weight fluorine-containing polymeric composition which may be molded at a temperature at which degradation of the polymer is at a minimum.

A further object is to provide a resinous thermoplastic composition of trifluorochloroethylene having improved flow properties and which can be molded at a temperature at which degradation of the thermoplastic is at a minimum.

A further object is to provide a resinous thermoplastic trifluorochloroethylene / vinylidene fluoride copolymer composition of improved stress properties, said copolymer containing less than 10, and preferably less than 6 mol percent of vinylidene fluoride.

A further object is to provide an elastomeric copolymer composition having improved low temperature flexibility, said copolymer containing from 20 to 69 mole percent of trifluorochloroethylene, and vinylidene fluoride as the remaining major constituent.

A still further object is to provide an efficient and novel process for modifying the properties of high molecular weight polymers including both homopolymers and copolymers.

A still further object is to provide a novel process for treating a normally solid polymer or trifluorochloroethylene to produce a modified polymer of improved properties and from which the modifier will not bleed or volatilize during fabrication of the polymer.

Various other objects and advantages of the present invention will become apparent to those skilled in the art from the following description and disclosure.

Accordingly, the above objects are accomplished by the process which comprises admixing a normally solid polymer with a ketone derivative of a fluorine-containing carboxylic acid, to produce a normally solid polymer of improved properties. The preferred ketones which are used as the modifying agent or plasticizer are the ketones derived from fluorochlorocarboxylic acids including both mono and poly-acids, said acids having at least as many fluorine atoms as there are chlorine atoms and contain —$CF_2$— and —$CFCl$ groups. The polymer which is modified to best advantage in accordance with the present invention is a normally solid fluorine-containing polymer having a high molecular weight, i.e. a molecular weight above about 50,000 and is preferably a high molecular weight polymer of a fluorochloroethylene containing at least two fluorine atoms for every chlorine atom such as in trifluorochloroethylene including both resinous thermoplastics and elastomers derived therefrom.

The modified polymer produced in accordance with this invention has improved tensile strength and flow properties, and is moldable at a temperature below the temperature required for molding of the untreated polymer and/or improved low temperature flexibility. These improved properties are obtained without deleterious effect on the chemical inertness, heat stability and other desirable properties of the polymer.

The weight ratio of the ketone modifier to polymer may vary over relatively wide limits without departing from the scope of this invention to obtain varying degrees of modification of the polymer. The properties of the polymer are modified by as little as 0.1 weight percent of the ketone, based on the total weight of the polymer employed. Generally, however, the weight ratio of ketone modifier to polymer which is employed ranges between about 0.05:1 and about 1:1, and is preferably between about 0.1:1 and about 0.5:1.

Admixture of the polymer to be modified and the ketone of the fluorine-containing carboxylic acid may be accomplished in a variety of ways. For example, incorporation of the ketone into the polymer may be accomplished in the dry state and in the wet state. The treatment of the solid polymer and the ketone may be accomplished over a relatively wide range of temperatures such as between about 0° C. and about 150° C. and, in general, a temperature within the range of between about 10° C. and about 100° C. is employed. The process of the present invention may be carried out at atmospheric pressure or under superimposed pressures up to 1,000 pounds per square inch gage.

The referred ketones to be used in accordance with the present invention are those derived from perfluorochlorocarboxylic acids including both the mono- and poly-acids, said acids having from 4 to 20 carbon atoms, and preferably from 6 to 16 carbon atoms per molecule, and having at least 2 fluorine atoms for every chlorine atom. For example, the preferred monoketones are derived from perfluorochlorocarboxylic acids having the general formula:

$$Z(CF_2CFCl)_{n-1}CF_2COOH \qquad (1)$$

wherein Z is selected from the group consisting of chlorine, fluorine and bromine, and perhalomethyl radicals having a total atomic weight not in excess of 146.5; and n is an integer from 2 to 10. Such acids are obtained by hydrolysis of the products of trifluorochloroethylene telomerized with a bromohalomethane such as, for example, bromotrichloromethane, or with a sulfuryl halide such as, for example, sulfuryl chloride. These telomers are represented by the following general formulas, respectively:

$$M(CF_2CFCl)_n-Br \qquad (2)$$

$$Y_1(CF_2CFCl)_n-Y_2 \qquad (3)$$

wherein M is perhalomethyl radical having a total atomic weight not higher than 146.5; n is an integer from 2 to 10; $Y_1$ is a halogen selected from the group consisting of fluorine, chlorine, and bromine; and $Y_2$ is a halogen selected from the group consisting of bromine and chlorine. The hydrolysis of such telomer products is carried out in fuming sulfuric acid at a temperature between about 140° C. and about 300° C. This hydrolysis also leads to the production of a mixture of perfluorochlorodicarboxylic acids which also are useful as starting materials to produce diketones which also may be used in accordance with this invention.

Various derivatives of the above fluorine-containing acids are employed as starting materials to produce the ketone modifiers of this invention and are, for example, the acid halides, acid anhydrides, esters and nitriles. The acid halide derivatives are prepared by reaction of the acids with a halogenating agent such as phosphorus trichloride, phosphorus pentachloride, phosphorus tribromide, thionyl bromide, and similar fluorinating and iodinating agents. The acid fluorides, bromides and iodides also may be prepared by reacting the acid chloride with hydrogen fluoride, hydrogen bromide, or hydrogen iodide. These reactants are usually conducted at a temperature between about 20° C. and about 100° C., and preferably between about 30° C. and about 60° C. The perfluorochlorocarboxylic acids are converted to their acid anhydrides by preparing a solution of the acid in a fluorocarbon acid anhydride such as perfluorobutyric anhydride, and then refluxing the reaction mixture over phosphorus pentoxide. The esters are produced by a variety of procedures one of which being the direct esterification of the perfluorochlorocarboxylic acid or acid chloride with an alcohol or phenol in the presence or absence of a catalyst. The nitrile derivatives may be prepared as described in our prior and copending application Serial No. 509,408, filed May 18, 1955, now U.S. Patent No. 2,788,362.

The ketones of the above fluorine-containing acids which are used as modifiers as described herein may be prepared in a variety of ways. For example, they may be prepared by (1) the interaction between a perfluorochlorocarboxylic acid halide and an organometallic compound, such as an alkyl, aryl, alkenyl, cycloalkyl, cycloalkenyl, or heterocyclic cadmium, zinc, aluminum, lead, silver, copper, or bismuth compound. The ketones also may be prepared by (2) the reaction of a perfluorochlorocarboxylic acid halide with an aromatic compound in the presence of a catalyst, or (3) by the interaction of a perfluorochloronitrile with a Grignard reagent having the formulas RMgX, in which R is alkyl or aryl, and X is halogen, or (4) by the interaction of an ester of a perfluorochlorocarboxylic acid and an active hydrogen-containing compound in the presence of an alkaline reagent, or (5) by the interaction of a perfluorochlorocarboxylic acid anhydride and an aromatic compound in the presence of a catalyst, or (6) by the addition of aldehydes to perfluorochloroolefins, or (7) by the oxidation of polyfluorochloro secondary alcohols.

In method 1 above, for example, in which the ketones are prepared by reacting a perfluorochlorocarboxylic acid halide with an organometallic compound, the organometallic compound such as an alkyl or aryl cadmium reagent, is obtained by preparing a Grignard reagent in ether solution, adding an anhydrous cadmium halide while stirring, and refluxing the mixture. Suitable cadmium compounds are formed from Grignard reagents such as $CH_3MgI$, $C_2H_5MgI$, $C_3H_7MgBr$, $C_4H_9MgBr$, $(CH_3)_2CHMgBr$, $C_6H_5MgBr$, $C_6H_5CH_2MgCl$, and the like. Where higher reaction temperatures are required, the ether solvent may be replaced by a higher boiling solvent, such as benzene, cyclohexane, toluene, xylene, and the like, benzene being preferred. Generally speaking, in this method of preparation the acid halide or a solution of the acid halide is gradually added to a cold agitated mixture of the alkyl or aryl cadmium reagent. After the addition, stirring is continued at a temperature in the range of about −20° C. to about 175° C., preferably at about the boiling temperature of the solvent, i.e., 30° C. to 140° C., during a period between about 0.5 hour and about 8 hours, preferably between about 1 hour and about 4 hours. The molar ratio of monoacid halide to alkyl or aryl cadmium compound is between about 3:1 and about 1:10, preferably between about 2:1 and about 1:2. If a polyacid halide is used, the ratio is correspondingly increased in favor of the cadmium compound.

Further, in accordance with the second of the methods listed above, a perfluorochlorocarboxylic acid halide is reacted with an aromatic compound to form aromatic ketones of polyketones in the presence of a Lewis acid catalyst, such as $AlCl_3$, $AlBr_3$, $ZnCl_2$, $SnCl_4$, and $BF_3$, and of these, $AlCl_3$, is preferred. The reaction is performed in the presence of a solvent for the acid halide and/or the aromatic compound, the solvent serving to suspend the catalyst in the mixture and to promote better mixing of the reactants. Generally speaking, this method of ketone preparation is performed by gradually adding the perfluorochlorocarboxylic acid halide, preferably the chloride, to the aromatic compound with agitation using a molar ratio of acid chloride to aromatic compound of about 1:1 to about 1:20, preferably about 1:1 to about 1:10, based upon the use of a monoacid chloride. The reaction occurs at temperatures in the range of about −10 to 100° C., preferably between 0° C. and about 50° C., the reaction time being between about 0.5 hour and about 48 hours, preferably between about 1 hour and about 16 hours.

The preferred monoketones produced by the above described methods and used to produce the improved polymeric compositions of this invention have the general formula:

$$Z(CF_2CFCl)_{n-1}CF_2\overset{O}{\underset{\|}{C}}-R \qquad (4)$$

in which Z is halogen or a perhalomethyl radical having a total atomic weight not in excess of 146.5, Z preferably being chlorine; n is an integer from 2 to 10; and R is a substituted or unsubstituted alkyl, aryl, alkenyl, cycloalkyl, cycloalkenyl, or heterocyclic radical having not in excess of about 20 carbon atoms per radical.

As indicated above, the hydrolysis of the aforesaid trifluorochloroethylene telomers leads to the production of a mixture of monoacids and diacids. The mixture of diacids which is obtained may be separated into individual compounds by distillation and each of the individual diacids subsequently converted to the corresponding diketone; or the mixture of diacids may be converted to a mixture of diketones, which mixture of diketones, prior to use as described herein, may or may not be separated into its individual compounds as desired. Typical classes of suitable diketones produced by the above methods have the following general formulas:

$$R-\overset{O}{\underset{\|}{C}}-CF_2(CF_2CFCl)_{n-2}CF_2-\overset{O}{\underset{\|}{C}}-R \qquad (5)$$

$$R-\overset{O}{\underset{\|}{C}}-CFCl(CF_2CFCl)_{n-2}CF_2-\overset{O}{\underset{\|}{C}}-R \qquad (6)$$

in which n preferably is an integer from 2 to 8 and R is a substituted or unsubstituted alkyl, aryl, alkenyl, cycloalkyl, cycloalkenyl, or heterocyclic radical having not in excess of about 20 carbon atoms per radical.

Exemplary of the unsubstituted alkyl radicals which may be used in the above formulas are methyl, ethyl, propyl, butyl, and the like and isomers thereof, while substituted alkyl radicals may be 2-ethoxyethyl, 2-methoxyethyl, and a like and isomers thereof; unsubstituted aryl radicals may be phenyl, xylyl, ethylphenyl, cymyl, duryl, cumyl, naphthyl, methylnaphthyl, benzyl, and the like and isomers thereof, while substituted aryl radicals may be anisyl, dimethoxyphenyl, chlorophenyl, chloroxyl, dichlorophenyl, chloroanisyl, chloronaphthyl, dimethylaminophenyl, vinylphenyl, cresyl, hydroxyphenyl, aminophenyl, and the like isomers thereof; unsubstituted alkenyl radicals may be allyl, butenyl, pentenyl, and the like and isomers thereof, while substituted alkenyl radicals may be 2-ethoxyallyl and the like; unsubstituted cycloalkyl radicals may be cyclohexyl, cyclopentyl, cyclobutyl, bornyl, methylcyclohexyl, camphanyl, and the like and isomers thereof, while substituted cycloalkyl radicals may be methoxycyclohexyl, dimethylaminocyclohexyl, and the like and isomers thereof; unsubstituted cycloalkenyl radicals may be cyclohexenyl, cyclopentenyl, methylcyclohexenyl, and the like and isomers thereof, while substituted cycloalkenyl radicals may be methoxycyclohexenyl, and the like and isomers thereof; and unsubstituted heterocyclic radicals may be pyranyl, furyl, pyrryl, thienyl, pyridyl, pyrazinyl, and the like and isomers thereof, while substituted heterocyclic radicals may be chlorofuryl, chloropyrryl, chlorothienyl, dichloropyrryl, methoxypyridyl, and the like and isomers thereof.

Typical examples of suitable ketones are as follows: propyl 2,4,5-trichlorooctafluoropentyl ketone; phenyl 2,4,6,7-tetrachloroundecafluoroheptyl ketone having the formula, Cl(CF₂CFCl)₃CF₂COC₆H₅; chlorophenyl 2,4,6,7-tetrachloroundecafluoroheptyl ketone; butyl 2,4,6,7-tetrachloroundecafluoroheptyl ketone; propyl 2,4,6,7-tetrachloroundecafluoroheptyl ketone; ethyl 2,4,6,7-tetrachloroundecafluoroheptyl ketone; allyl 2,4,6,7-tetrachloroundecafluoroheptyl ketone; cyclohexyl 2,4,6,7-tetrachloroundecafluoroheptyl ketone; methyl 2-hydro-4,5-dichlorooctafluoropentyl ketone having the formula, Cl(CF₂CFCl)₂CFHCF₂COCH₃

1,6-dibenzoyl-2,4-dichlorodecafluorohexane having the formula, C₆H₅COCF₂(CF₂CFCl)₂CF₂COC₆H₅; 2'-furoyl-2-hydro-4,6,7-trichloroundecafluoroheptane having the formula, Cl(CF₂CFCl)₂CF₂CHFCF₂CO<span>C=CH—CH=CH—O</span> and propyl bis-(3,5,7,8-tetrachloroperfluorooctoyl) methane. It is to be understood that any of the above ketone modifiers may be used singly or in admixture to produce the improved polymeric compositions of this invention without departing from the scope of this invention.

The polymers which are modified to best advantage by the process of the present invention are the normally solid high molecular weight resinous thermoplastic and elastomeric polymers obtained by polymerization of a fluorine-containing olefin, which olefin is preferably one containing at least two fluorine atoms per molecule and not in excess of about 12 carbon atoms, and preferably not more than 8 carbon atoms, per molecule. The polymers which are markedly improved by the modifiers of the present invention are polymers of a fluorochloroolefin which is preferably a perfluorochloroolefin. Typical examples of polymers which are treated as described herein are the homopolymers of fluoromonoolefins such as vinylidene fluoride, tetrafluoroethylene, trifluorochloroethylene, bromotrifluoroethylene; homopolymers of fluorine-containing polyenes such as 1,1-difluorobutadiene, 1,1,2-trifluorobutadiene, 1,1,3-trifluorobutadiene, 1,1-difluoro-3-methyl butadiene, and 2-trifluoromethyl butadiene; homopolymers of fluorine-containing alpha-methylene carboxylic acids and derivatives thereof such as alpha-trifluoromethyl acrylonitrile and methyl-alpha-trifluoromethacrylate; and the homopolymers of fluorinated styrenes such as phenyltrifluoroethylene.

Copolymers which may be modified by the process of the present invention include those obtained from any of the above-mentioned fluorine-containing monomers as well as from trifluoroethylene, dichlorodifluoroethylene, 3,3,3-trifluoropropene, perfluoropropene, and perfluoroisobutene, and a polymerizable hydrocarbon type olefin. The polymerizable hydrocarbon type olefin which may be used as a comonomer is preferably an olefin having not in excess of about 10 carbon atoms per molecule and includes the ethylenically mono- and diunsaturated hydrocarbons, derivatives of alpha-methylene carboxylic acids, vinyl ethers and alkyl acrylates.

Typical examples of suitable copolymers which are advantageously treated as described herein are those of trifluorochloroethylene and vinylidene fluoride including the resinous copolymers thereof, for example, those containing from 69 to 80 mol percent of trifluorochloroethylene, and elastomeric copolymers thereof, i.e. those containing from 20 to 69 mol percent of trifluorochloroethylene; trifluorochloroethylene and tetrafluoroethylene; trifluorochloroethylene and vinyl fluoride; trifluorochloroethylene and vinyl chloride; trifluorochloroethylene and vinylidene chloride; trifluorochloroethylene and hexafluoropropene; trifluorochloroethylene and trifluoroethylene; tetrafluoroethylene and 1,1-chlorofluoroethylene; vinylidene fluoride and 1,1-chlorofluoroethylene; perfluoropropene and vinylidene fluoride; tetrafluoroethylene and butadiene; trifluorochloroethylene and n-butyl acrylate; trifluorochloroethylene and 1,1,2,2-tetrafluoroethyl vinyl ether; and trifluorochloroethylene and 1,1-difluorobutadiene.

As above-stated, admixture of the normally solid polymer and the ketone modifier may be accomplished in a variety of ways. One technique involves admixing the polymer and modifier in the dry state in finely divided form, that is in the form of a powder preferably of sufficient fineness to pass through a 40 mesh screen or finer. Convenient tumbling-type mixers such as a barrel mixer and conical mixer may be employed. If the polymer and modifier are not in a sufficiently divided form then they may be ground in a suitable grinding type mixer such as a micropulverizer. Admixture may also be effected by a wet blending technique employing a suitable liquid medium. When using a wet blending technique admixture is effected by placing the ingredients in the desired proportions in an apparatus suitable for wet blending such as a ball mill. Mixture of naphtha, toluene and aliphatic ketones such as acetone and methyl ethyl ketone, may be employed as the medium in which wet blending is carried out.

In order to obtain the maximum intimate contact between the modifier and polymer and extremely homogeneous blends of ingredients, the modifier may be added to a suspension or dispersion of the polymer in a liquid medium. Such a technique leads to markedly improved modification of the polymers, and volatilization or bleeding of the modifier from the polymer during its fabrication has been found to be negligible when such a technique is employed. Typical dispersions of polymers which may be treated in accordance with the process of the present invention are those disclosed in U.S. Patent Nos. 2,686,738, 2,686,767 and 2,686,770. The admixture of the dispersion of polymer and ketone modifier is accomplished with moderate agitation. The mixture thus obtained may be applied directly as such to a surface such as a metal or fabric surface by conventional spraying or dipping techniques to obtain more flexible and improved protective coatings. Alternatively, the dispersion of the modified polymer may be allowed to settle, or the more stable dispersions may be coagulated by conventional techniques such as by freezing in a solid carbon dioxide-acetone bath.

The ketone modifier also may be added directly to the aqueous suspension or dispersion of polymer as the polymer is obtained from the polymerization zone. Such dispersions of polymers, e.g., those of trifluorochloroethylene polymers, are obtained by conducting the polymerization in an aqueous suspension type catalyst system in which a water soluble peroxy promoter such as potassium persulfate is employed with or without the addition of an activator such as sodium bisulfite, an accelerator such as ferrous sulfate, or an emulsifier such as the metal salts of the above-described perfluorochlorocarboxylic acids.

In some instances it is sometimes beneficial to have a peroxy compound present when the polymer and ketone modifier are admixed. Modification of the polymer in the presence of a peroxy promoter is particularly preferred and effective when an unsaturated ketone such as allyl 2,4,6,7-tetrachloroundecafluoroheptyl ketone is used as the modifier. Such promoters comprise the inorganic and organic peroxides. Examples of suitable inorganic peroxides are the water-soluble peroxides such as the perborates, persulfates, perphosphates, percarbonates, barium peroxide, zinc peroxide and hydrogen peroxide. Particularly valuable are the water-soluble salts of the peracids such as the sodium, potassium, calcium, barium and ammonium salts of the persulfuric and perphosphoric acids. Examples of suitable organic peroxides comprise the water-soluble peroxides such as diacetyl peroxide, trichloroacetyl peroxide, perfluoropionyl peroxide, dichlorofluoroacetyl peroxide, 3,4-dibromobutyryl peroxide, 3-carboxypropionyl peroxide, and benzoyl peroxide. When such compounds are employed, they are admixed with the modifier and polymer in a weight ratio of promoter to polymer of between about 0.001:1 and about 0.2:1, and preferably in a weight ratio of between about 0.01:1 and about 0.1:1.

The modified polymeric compositions of the present invention in the form of dry molding powder may be molded by using suitable molding equipment at a temperature between about 200° F. and about 450° F. and at a pressure between about 500 and about 25,000 pounds per square inch. The molding is accomplished with negligible thermal degradation of the polymer and with a minimum amount of bleeding of the added ketone of the perfluorohalocarboxylic acid from the polymer.

The following examples are offered as a better understanding of the present invention and are not to be construed as unnecessarily limiting thereto.

EXAMPLE 1

This example is intended to illustrate the preparation of various ketones of fluorine-containing carboxylic acids which are used as modifiers in accordance with this invention.

(A) Preparation of $Cl(CF_2CFCl)_3CF_2COC_6H_5$

To a stirred, cold mixture of 113 grams (0.85 mol) of $AlCl_3$ in 500 ml. of dry benzene were added, over a 15 minute period, 384 grams (206 ml.; 0.77 mol) of $Cl(CF_2CFCl)_3CF_2COCl$. The mixture was stirred for 5 hours while allowing it to warm to room temperature. During the first two hours, the mixture darkened while becoming homogeneous (the reaction is exothermic and the temperature rises to about 40° C.). The solution was decomposed with about a 1 liter mixture of water and ice to which 100 ml. of 6 N HCl had been added. The organic phase was washed several times with 3 percent HCl and then with water. Most of the benzene was removed on a steam bath using a nitrogen stream. To the cooled residue was added about 0.5 liter of ether and the resulting solution was washed three times with 5 percent sodium bicarbonate, twice with water and once with a saturated sodium chloride solution. The solvent was evaporated and the residue was fractionated through a 6 inch Vigreaux column to give, after a 9 gram forerun, 303 grams (0.565 mole; 73.5 percent) of pale yellow liquid, B.P. 138 to 144° C./to 1.5 mm., $d_4^{20}=1.725$, $n_D^{20}=1.4555$ (a 36 gram tarry residue remained). This compound was identified as phenyl 2,4,6,7-tetrachloroperfluoroheptyl ketone.

(B) Preparation of $Cl(CF_2CFCl)_3CF_2COC_4H_9$

To a dry nitrogen flushed flask containing 0.42 mol of magnesium turnings and 50 ml. of dry ether was added slowly with stirring 0.42 mol of n-butyl bromide in 150 ml. of dry ether. After the exothermic reaction had subsided, the mixture was refluxed for 0.5 hour. Anhydrous cadmium chloride (0.23 mol) was added to the cooled, stirred solution and the mixture was allowed to stand overnight under nitrogen. After refluxing for 1 hour, $Cl(CF_2CFCl)_3CF_2COCl$ (0.40 mol) in 150 ml. of ether was added with stirring to the cooled mixture. The resulting pasty mixture was diluted with ether and refluxed with stirring for 1.5 hours. The mixture was cooled and poured into 250 grams of ice and water. The resulting acidic mixture was separated and the organic phase was washed with sodium bicarbonate (5 percent aq.) and then with a saturated sodium chloride solution until neutral. After treating with anhydrous calcium sulfate, the ether solution was evaporated and the residue was distilled at reduced pressure. The results of this distillation are as follows:

| Fraction | Weight (grams) | B. P. (0° C.) | P. (mm.) | $n_D^{20}$ | $d_4^{20}$ |
| --- | --- | --- | --- | --- | --- |
| 1 | 2.6 | 126–129 | 2.3 | 1.4021 | 1.637 |
| 2 | 8.1 | 129–131 | 2.5 | 1.4027 | 1.636 |
| 3 | 15.5 | 131–132 | 2.6 | 1.4029 | 1.636 |
| 4 | 4.9 | 132–171 | 2.6–0.08 | 1.4060 | 1.712 |
| 5 | 10.2 | 171–176 | 0.08 | 1.4075 | 1.796 |
| 6 | 12.8 | 176–178 | 0.09 | 1.4078 | 1.791 |
| 7 | 10.3 | 178–189 | 0.09–0.5 | 1.4082 | 1.785 |
| 8 | 3.2 | 189+ | 0.5 | 1.4084 | |
| 9 | 3.5 | Residue | | | |

The molar refractivity for $Cl(CF_2CFCl)_3CF_2COC_4H_9$ is calculated to be 77.8. Fraction 2 gives a value of 77.5. Analysis of Fraction 2: Calc. for $C_{12}H_9OCl_4F_{11}$: Cl, 27.2. Found: Cl, 27.1. Semicarbazone analysis: Calc. for $C_{13}H_{12}ON_3Cl_4F_{11}$: N, 7.3; Found: N, 7.4, 7.22.

(C) Preparation of methyl-2-hydro-4,5-dichloroocta-fluoropentyl ketone

Methyl - 2 - hydro - 4,5 - dichlorooctafluoropentyl carbinol (0.3 mol) and 10 ml. of glacial acetic acid are poured into a 500 ml., 3-necked flask, and a mixture of 75 grams of sodium dichromate, 100 ml. of water and 75 grams of $H_2SO_4$ is added dropwise with stirring over a period of 3 hours. The reaction mixture is extracted with benzene, dried over anhydrous calcium sulfate, and fractionated to give methyl-2-hydro-4,5-dichloroocta-fluoropentyl ketone in about 60 percent yield.

(D) Preparation of

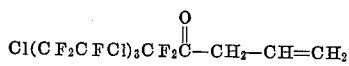

A Grignard reagent is prepared from 0.2 mol of Mg turnings in 0.5 liter of anhydrous ethyl ether and 0.2 of allyl chloride and is added to a flask equipped with a stirrer, a reflux condenser and a dropping funnel. 3,5,7,8-tetrachloroundecafluorooctanonitrile (0.2 mol) is added, over a 2 hour period, to the chilled Grignard solution and is stirred for 3 hours at room temperature. Hydrolysis is effected by the dropwise addition of 300 ml. of 20 percent aqueous $H_2SO_4$. The ether layer is separated, dried and evaporated and the residual liquid is fractionated to give allyl-2,4,6,7-tetrachloroundecafluoroheptyl ketone in about a 55 percent yield.

(E) Preparation of

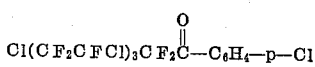

To a stirred, ice cold mixture of 0.33 mol of $AlCl_3$ and 250 ml. of chlorobenzene was added, over a 30 min. period, a solution of 0.3 mol of $Cl(CF_2CFCl)_3CF_2COCl$ in 80 ml. of chlorobenzene. The mixture was allowed to warm to room temperature while stirring for a total of 24 hours. The dark reaction mixture was decomposed with ice and dilute HCl. The organic layer was washed successively with dilute acid and water. The organic layer was evaporated, the residue taken up in ether, washed with 5% $NaHCO_3$ and then with water and saturated NaCl until neutral. The ether was evaporated and the residue distilled through a 6" Vigreaux column. Yield, 0.15 mol (50%) of a clear, colorless liquid, B.P. 164° C./1.4 mm., $d_4^{20}$ 1.763; $n_D^{20}$ 1.4685; and having the structure

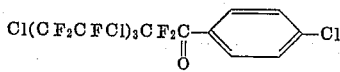

EXAMPLE 2

This example is intended to illustrate the modification of the thermoplastic homopolymer of trifluorochloroethylene with phenyl 2,4,6,7-tetrachloroundecafluoroheptyl ketone and related ketones.

An intimate admixture of 100 grams of polytrifluorochloroethylene homopolymer having an N.S.T. (no-strength temperature) of 300° C. and 20 grams of $Cl(CF_2CFCl)_3CF_2COC_6H_5$ prepared as described in part A of Example 1 above, was made by the addition of the ketone to finely divided polymer in a conventional tumbling-type mixer at about 25° C. After blending the two ingredients by tumbling for a period of about 4 hours, a 1 gram sample of the modified polymer was submitted to compression molding which involved preheating the sample at 400° F. for 4 minutes followed by pressing for 2 minutes at 460° F. under 20,000 pounds per square inch pressure. A clear, transparent, continuous, and very flexible plastic sheet was obtained with no evidence of bubble formation or volatilization of the ketone during the molding operation at 460° F. The diameter of the pressed sheet was measured as an indication of the relative flow character as compared to that of the untreated polytrifluorochloroethylene homopolymer and was found to be 1.8 inches. Essentially no flow of the untreated polymer is observed at temperatures below 500° F. under the same temperature and pressure conditions of molding. Similar results are obtained when p-chlorophenyl 2,4,6,7-tetrachloroperfluoroheptyl ketone is employed as the modifier instead of the above-indicated phenyl ketone.

EXAMPLE 3

This example is intended to illustrate the modification of a thermoplastic copolymer of trifluorochloroethylene with the fluorochloro ketones of the present invention.

An intimate admixture of 100 grams of the resinous thermoplastic copolymer of trifluorochloroethylene and vinylidene fluoride containing about 96 mol percent and about 4 mol percent of trifluorochloroethylene and vinylidene fluoride, respectively, and 15 grams of phenyl 2,4,6,7-tetrachloroundecafluoroheptyl ketone was made by the addition of the ketone to finely divided copolymer in a conventional tumbling type mixer at 25° C. After blending the two ingredients by tumbling for a period of about 4 hours, the resultant polymeric composition was heat treated for 10 minutes at 150° C. and then quenched. The resultant composition was then subjected to compression molding at 265° C. for 2 to 3 minutes. The molded sample was pliable and clear and showed no evidence of clouding or volatilization of the ketone modifier. The modified resinous copolymer composition exhibited improved stress-strain properties or improved tensile strength as compared to the unmodified copolymer. The stress-strain data for the modified composition of this example were obtained using standard ASTM specimens on the Instron Tensile Tester. The cross-head speed was 0.2 inch per minute and the ultimate tensile and elongation were determined using a cross-head speed of one inch per minute. These data are as follows: at about 25% elongation the tensile strength of the modified copolymer was 1,000 p.s.i.; at 50% elongation the tensile strength was about 1,400 p.s.i.; and at 75% elongation the tensile strength was about 1,500 p.s.i. Similar results were obtained by intimately admixing 100 grams of the above copolymer with 25 grams of the phenyl ketone.

When the resinous copolymer of trifluorochloroethylene and vinylidene fluoride containing about 77 mol percent of trifluorochloroethylene are admixed as described above with about 20 weight percent of phenyl 2,4,6,7-tetrachloroundecafluoroheptyl ketone, the resultant composition possesses improved flow properties and that the ketone does not volatilize from the polymer during molding at elevated temperatures.

EXAMPLE 4

This example is intended to illustrate the modification of a thermoplastic polymer of trifluorochloroethylene with butyl 2,4,6,7-tetrachloroundecafluoroheptyl ketone.

An intimate admixture of 50 grams of polytrifluorochloroethylene homopolymer having an N.S.T. (no-strength temperature) of 300° C. and 10 grams of

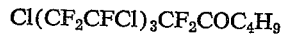

prepared as described in part A of Example 1 above, was made by the addition of the ketone to finely divided polymer in a conventional tumbling-type mixer at about 25° C. After blending the two ingredients by tumbling for a period of about 4 hours, a 1 gram sample of the modified polymer was submitted to compression molding which involved preheating the sample at 400° F. for 4 minutes followed by pressing for 2 minutes at 460° F. under 20,000 pounds per square inch pressure. A clear, transparent, continuous, and very flexible plastic sheet was obtained with no evidence of bubble formation or volatilization of the ketone during the molding operation at 460° F. The diameter of the pressed sheet was measured as an indication of the relative flow character as compared to that of the untreated polytrifluorochloroethylene homopolymer and was found to be 1.6 inches. Essentially no flow of the untreated polymer is observed at temperatures below 500° F. under the same conditions of molding. By employing the same procedure of this example, the flow properties of the resinous thermoplastic copolymer of trifluorochloroethylene and vinylidene fluoride containing about 77 mol percent of trifluorochloroethylene, were improved by treatment with the above butyl ketone.

EXAMPLE 5

This example is intended to illustrate the modification of a high molecular weight fluorine-containing elastomer by the addition thereto of phenyl 2,4,6,7-tetrachloroundecafluoroheptyl ketone.

(A) The elastomer which is modified by the procedure of this example contains 49 mol percent of combined trifluorochloroethylene and 51 mol percent of combined vinylidene fluoride, and was prepared by the following polymerization reaction:

A two gallon autoclave was charged with 15,650 grams of water, 1.6 grams of potassium persulfate, 3.2 grams of sodium metabisulfite, and 8.4 grams of ferrous sulfate heptahydrate. Thereafter the autoclave was charged with 8500 grams of trifluorochloroethylene and 8720 grams of vinylidene fluoride. The polymerization reaction was conducted under autogenous conditions of pressure at a temperature of 5° C. for a period of 20 hours after which period unreacted monomers were removed by flash distillation. The polymer latex was coagulated by freezing. The coagulated product was collected, washed with hot water, and dried yielding an elastomer which upon analysis was found to contain 49 mol percent of combined trifluorochloroethylene and 51 mol percent of combined vinylidene fluoride.

(B) 100 grams of the raw elastomeric copolymer stock prepared according to the procedure of part A of this example, are banded on a 2 roll rubber mill heated to about 45° C. There are then slowly added thereto 30 grams of $Cl(CF_2CFCl)_3CF_2COC_6H_5$. The ketone is added to the elastomer with constant cutting and turning of the stock on the mill. The ketone mixes readily with the trifluorochloroethylene-vinylidene fluoride copolymer, essentially no bleeding of the modifier is observed, and a softer, more rubbery product of improved low temperature flexibility is observed.

EXAMPLE 6

This example illustrates the modification of an elastomeric fluorine-containing solid polymer with allyl 2,4,6,7-tetrachloroundecafluoroheptyl ketone.

100 grams of the raw elastomeric copolymer stock prepared according to the procedure of part A of Example 5 above, are banded on a 2 roll rubber mill heated to about 45° C. There are then added 15 grams of allyl 2,4,6,7-tetrachloroundecafluoroheptyl ketone, 10 grams of zinc oxide, 10 grams of Dyphos and 1.5 grams of benzoyl peroxide accompanied by constant cutting and turning of the stock on the mill at a temperature of 150°–160° F. The resultant composition is then precured for one-half hour at 250° F. and cured at 16 hours at 300° F. The precured sample shows no evidence of bubbling indicating a non-fugitive and probably cross-linked plasticizer.

By employing procedures similar to those of Examples 2–6 above, the flow properties and flexibility of other normally solid thermoplastic polymers such as the copolymer of trifluorochloroethylene and vinylidene fluoride containing between about 69 and about 80 mol percent of combined trifluorochloroethylene; polytetrafluoroethylene homopolymer; and other elastomeric polymers such as those of hexafluoropropene and vinylidene fluoride containing above 15 mol percent of hexafluoropropene, are similarly modified by employing the ketone modifiers of this invention.

When the product of the present invention is produced in the absence of a peroxy promoter, the product is an extremely homogeneous blend of the polymer and modifier which may or may not be cross-linked to some extent. However, when a peroxy promoter is employed, there is more likelihood of causing chemical reaction between the polymer and ketone modifier to produce a more highly cross-linked polymer in which the ketone modifier is chemically bonded to the polymer. The cross-linking which is promoted by the presence of a peroxy compound is particularly apparent when an unsaturated ketone is employed. When it is desired to obtain a modified polymer having the improved properties brought about by cross-linking, it is preferred to have a peroxy compound present during the treatment of the polymer with the ketone. When the aqueous dispersions of the polymers which are treated in accordance with the present invention are prepared in a polymerization catalyst system comprising a water soluble peroxy promoter such as potassium persulfate, there often is a sufficient amount of the peroxy compound to promote cross-linking of the modifier and polymer and thus additional quantities of the promoter do not have to be added. The above cause for the improved results obtained by the present method and composition is merely theoretical and other theories or reasons may equally well explain the invention and may ultimately be found to be the true cause.

The improved polymeric compositions of this invention find particular utility as high temperature corrosion resistant flexible pump and valve diaphragms, O-rings, flexible extruded film for packaging and as extruded tape for electrical insulation.

As is apparent the present invention relates to improved compositions of matter comprising a solid polymer having a ketone derivative of a fluorine-containing carboxylic acid incorporated therein either through physical or chemical bonds or both, and to a process for the preparation thereof. It is to be understood that various finely divided solids which serve as fillers can be incorporated within the compositions of this invention. Examples of suitable fillers include pigments such as titanium oxide, metals such as copper and iron powder, and other finely divided solids such as mica and asbestos.

Various modifications and alterations of the compositions of this invention, and of the ketone modifiers and polymers, and reaction conditions employed, may become apparent to those skilled in the art from the accompanying description and disclosure.

Having described our invention, we claim:

1. A composition which comprises an admixture of a normally solid polymer of a fluorine-containing olefin containing at least two fluorine atoms per molecule and not in excess of about 12 carbon atoms, said polymer having a molecular weight above about 50,000, and between 0.1 and 100 weight percent based on total polymer weight of a ketone derivative of a perchlorofluorocarboxylic acid having not more than two carboxyl groups, said ketone having at least one chlorine atom and a

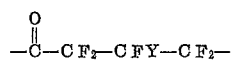

group wherein Y is selected from the group consisting of hydrogen and chlorine.

2. The composition of claim 1 in which the fluorine-containing olefin is a perfluorohaloolefin.

3. A composition which comprises an admixture of a normally solid polymer of a fluorine-containing olefin containing at least two fluorine atoms per molecule and not in excess of about 12 carbon atoms, said polymer having a molecular weight above about 50,000, and between 0.1 and 100 weight per cent based on total polymer weight of a ketone having the formula

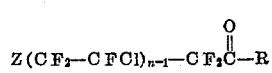

in which Z is selected from the group consisting of chlorine and perhalomethyl radicals having a total atomic weight not in excess of 146.5, $n$ is an integer from 2 to 10, and R is selected from the group consisting of substituted and unsubstituted alkyl, aryl, alkenyl, cycloalkyl, cycloalkenyl, and heterocyclic radicals having not in excess of about 20 carbon atoms.

4. A composition which comprises an admixture of a normally solid polymer of a perfluorohaloolefin containing at least two fluorine atoms per molecule and not in excess of about 12 carbon atoms, said polymer having a molecular weight above about 50,000, and between 0.1 and 100 weight percent based on total polymer weight of a ketone having the formula

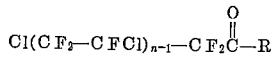

in which $n$ is an integer from 2 to 10 and R is selected from the group consisting of substituted and unsubstituted alkyl, aryl, alkenyl, cycloalkyl, cycloalkenyl, and heterocyclic radicals having not in excess of about 20 carbon atoms.

5. The composition of claim 4 in which the ketone is phenyl 2,4,6,7-tetrachloroundecafluoroheptyl ketone.

6. The composition of claim 4 in which the ketone is chlorophenyl 2,4,6,7-tetrachloroundecafluoroheptyl ketone.

7. The composition of claim 4 in which the ketone is butyl 2,4,6,7-tetrachloroundecafluoroheptyl ketone.

8. The composition of claim 4 in which the ketone is allyl 2,4,6,7-tetrachloroundecafluoroheptyl ketone.

9. A composition which comprises an admixture of a normally solid polymer of a fluorine-containing olefin containing at least two fluorine atoms per molecule and not in excess of about 12 carbon atoms, said polymer having a molecular weight above about 50,000, and between 0.1 and 100 weight percent based on total polymer weight of a diketone having the formula

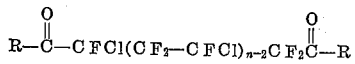

in which $n$ is an integer from 2 to 8, and R is selected from the group consisting of substituted and unsubstituted alkyl, aryl, alkenyl, cycloalkyl, cycloalkenyl, and heterocyclic radicals having not in excess of about 20 carbon atoms.

10. The composition of claim 9 in which the diketone is 1,6-dibenzoyl-2,4-dichlorodecafluorohexane.

11. A composition which comprises an admixture of trifluorochloroethylene homopolymer, having a molecular weight above about 50,000, and between 0.1 and 100 weight percent based on total polymer weight of phenyl 2,4,6,7-tetrachloroundecafluoroheptyl ketone.

12. A composition which comprises an admixture of trifluorochloroethylene homopolymer having a molecular weight above about 50,000, and between 0.1 and 100 weight percent based on total polymer weight of butyl 2,4,6,7-tetrachloroundecafluoroheptyl ketone.

13. A composition which comprises an admixture of a copolymer of trifluorochloroethylene and vinylidene fluoride having a molecular weight above about 50,000, and between 0.1 and 100 weight percent based on total polymer weight of phenyl 2,4,6,7-tetrachloroundecafluoroheptyl ketone.

14. A composition which comprises an admixture of a copolymer of trifluorochloroethylene and vinylidene fluoride having a molecular weight above about 50,000, and between 0.1 and 100 weight percent based on total polymer weight of allyl 2,4,6,7-tetrachloroundecafluoroheptyl ketone.

No references cited.